(12) United States Patent
Tomiie et al.

(10) Patent No.: US 8,808,143 B2
(45) Date of Patent: Aug. 19, 2014

(54) OUTPUT CONTROL DEVICE FOR VEHICLE

(71) Applicant: Fuji Jukogyo Kabushiki Kaisha, Tokyo (JP)

(72) Inventors: Katsuya Tomiie, Gunma (JP); Kazuhiro Oishi, Gunma (JP); Masahito Motoi, Gunma (JP); Toru Akiyama, Gunma (JP); Takayuki Shimizu, Gunma (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/667,394

(22) Filed: Nov. 2, 2012

(65) Prior Publication Data

US 2013/0123066 A1  May 16, 2013

(30) Foreign Application Priority Data

Nov. 14, 2011  (JP) .................. 2011-248445

(51) Int. Cl.
*B60W 10/04* (2006.01)
*B60W 10/18* (2012.01)
*F02D 9/06* (2006.01)

(52) U.S. Cl.
USPC ......................................... 477/203

(58) Field of Classification Search
USPC .......... 477/182, 183, 185, 187, 203–205, 207
See application file for complete search history.

(56) References Cited

U.S. PATENT DOCUMENTS

| 5,007,516 | A | * | 4/1991 | Miyazaki .................. 192/72 |
| 6,120,414 | A | * | 9/2000 | Endo et al. ................ 477/185 |
| 6,338,697 | B1 | * | 1/2002 | Baudoin et al. ........... 477/203 |
| 8,473,184 | B2 | * | 6/2013 | Yoon et al. ................ 701/110 |
| 2006/0293150 | A1 | * | 12/2006 | Baur et al. ................ 477/203 |
| 2012/0259524 | A1 | * | 10/2012 | Miyazaki et al. ......... 701/70 |

FOREIGN PATENT DOCUMENTS

JP  2005-291030  10/2005

* cited by examiner

*Primary Examiner* — Justin Holmes
(74) *Attorney, Agent, or Firm* — Smith, Gmabrell & Russell, LLP.

(57) ABSTRACT

There is provided an output control device for a vehicle. The device includes an accelerator operator to receive an output adjustment operation of a drive power of a vehicle; a brake operator to receive a braking operation of a braking device; an accelerator operation amount detection unit for detecting an operation amount of the accelerator operator; a brake operation force estimation unit for estimating an operation force of the brake operator; and an output suppression control unit for suppressing an output of the drive power regardless of a state of the accelerator operator, in the case where for a predetermined time or longer, a state continues in which the operation amount of the accelerator operator is greater than or equal to a predetermined accelerator threshold value, and the operation force estimated by the brake operator is greater than or equal to a predetermined brake threshold value.

12 Claims, 4 Drawing Sheets

OUTPUT CONTROL DEVICE FOR VEHICLE

CROSS-REFERENCE TO RELATED APPLICATIONS

The present application claims priority from Japanese Patent Application No. 2011-248445 filed on Nov. 14, 2011, the entire contents of which are hereby incorporated by reference.

BACKGROUND OF THE INVENTION

1. Field of the Invention

The present invention relates to an output control device for a vehicle, which suppresses the output of a drive power source such as an engine in the case where an accelerator operation and a brake operation of a vehicle are performed at the same time, and particularly, to an output control device for a vehicle, which performs appropriate output suppression control to which the intention of a driver is reflected.

2. Description of the Related Art

There is a known brake priority (brake override) control that suppresses the engine output in order to stop the vehicle safely in the case, for example, where a driver accidentally presses down on an accelerator pedal and a brake pedal at the same time, or the accelerator pedal does not return to its normal position due to a problem.

For example, to date, there has been known a safety device that suppresses the output of the engine according to the state of a brake switch that is turned on when the brake pedal is pressed down. Japanese Unexamined Patent Application Publication 2005-291030 describes a vehicle safety device that forces the engine to enter an idle state regardless of the depression amount of an accelerator pedal when the pressing-down of the brake pedal, or the brake operating pressure is greater than or equal to a predetermined value.

However, depending on the running condition of a vehicle, a driver may perform an accelerator operation and a brake operation at the same time intentionally. For example, when a driver stops the vehicle while driving on a steep slope, the driver may press-down the brake pedal temporarily with the left foot without releasing the right foot on the accelerator pedal in order to prevent the vehicle from rolling backward. In a sports running mode, when a driver performing a downshift operation of a manual transmission during a braking operation, the driver may perform a heel-and-toe operation for pressing down the accelerator pedal for a very short time in order to increase the number of revolutions of the engine in response to the gear ratio after the downshift. In addition, during cornering, a driver may perform a brake operation with the left foot for a short time in order to control the posture of the vehicle to shift the vehicle load. In this case, the above-described conventional technology suppresses the output of the engine against the intention of the driver.

SUMMARY OF THE INVENTION

It is an object of the present invention to provide an output control device for a vehicle, which performs appropriate output suppression control to which the intention of a driver is reflected in the case where an accelerator operation and a brake operation are performed at the same time.

An aspect of the present invention provides an output control device for a vehicle, including: an accelerator operator to receive an output adjustment operation of a drive power of a vehicle; a brake operator to receive a braking operation of a braking device; an accelerator operation amount detector for detecting an operation amount of the accelerator operator; a brake operation force estimator for estimating an operation force of the brake operator; and an output suppression controller for suppressing an output of the drive power regardless of a state of the accelerator operator, in the case where a state in which the operation amount of the accelerator operator is greater than or equal to a predetermined accelerator threshold value continues for a predetermined time or longer, and the operation force estimated by the brake operator is greater than or equal to a predetermined brake threshold value. With the above configuration, the output suppression control is performed only when for a predetermined time or longer, a state continues in which both an accelerator operation amount and a brake operation force are greater than or equal to the respective threshold values, and the estimated pressing force applied to the brake is greater than or equal to the brake threshold value, thereby making it possible to prevent the output suppression control from being performed against the intention of a driver when an accelerator operation and a brake operation are temporarily performed at the same time, for example, at the time of a heel-and-toe operation, or a temporary stop on a slope.

Preferably, the brake threshold value for the case where the brake operator is operated before the accelerator operator is operated is set to be greater than the brake threshold value for the case where the accelerator operator is operated before the brake operator is operated. With the above configuration, when a brake operation followed by an accelerator operation is performed, both pressing operations are probably performed intentionally by a driver, and thus control intervention against the intention of a driver can be prevented by setting a high brake threshold value. On the other hand, when an accelerator operator followed by a brake operation is performed, the operating accelerator may have a problem such as a fixed or non-returning accelerator problem, and thus the output suppression control intervention can be easily achieved by setting a low brake threshold value, thereby assuring the safety of the vehicle.

Preferably, a time until a start of output suppression performed by the output suppression controller is changed according to at least one of the operation force estimated by the brake operator and the operation amount of the accelerator operator. With the above configuration, when the operation force applied to the brake is strong, the intention of the driver to stop the vehicle is assumed to be probable, and thus the safety of the vehicle reflecting the intention of the driver is assured by advancing the timing of intervention of the output suppression control. When the operation amount of the accelerator operator is large, there is assumed to be no sufficient booster negative pressure, and thus the safety of the vehicle is assured by advancing the timing of intervention of the output suppression control.

Preferably, the brake operation force estimator estimates the brake operation force on the basis of a brake fluid pressure. With the above configuration, the brake operation force can be estimated by using a fluid pressure sensor which is typically disposed in a hydraulic control system or the like used for behavior control of a vehicle, and thus a new sensor does not need to be installed in the vehicle, thereby enabling the configuration of the device to be simplified.

Preferably, the brake operation force estimator compensates a value of the estimated brake operation force by using a negative pressure of a negative pressure brake booster. With the above configuration, by compensating the brake operation force estimated on the basis of the brake fluid pressure, by using the booster negative pressure of the negative pressure brake booster, the accuracy in estimating the brake operation force can be improved and more appropriate control can be performed.

DESCRIPTION OF THE PREFERRED EMBODIMENT

Embodiment

Hereinafter, an embodiment of an output control device for a vehicle according to the present invention will be described. In the embodiment, the vehicle is, for example, an automobile such as a passenger vehicle equipped with a gasoline engine in which an output is adjusted using a throttle. The vehicle includes an unillustrated hydraulic braking device. The braking device includes a brake pedal, a master cylinder, and a booster. The brake pedal is an operation pedal that a driver presses down with the driver's foot to perform a braking operation. The master cylinder is connected to the brake pedal by a link to generate a brake fluid pressure. The booster is a vacuum servo device which increases the brake fluid pressure generated by the master cylinder, by utilizing, for example, an intake pipe negative pressure of the engine, or a negative pressure generated by a negative pressure pump or the like. The brake fluid pressure increased by the booster is supplied to a wheel cylinder disposed in each of the wheels. The wheel cylinder generates a braking force by pressing a brake pad against a disk rotor that rotates with each wheel. The hydraulic control unit of the below-described behavior control device is disposed between the booster and each wheel cylinder.

Figure 1:
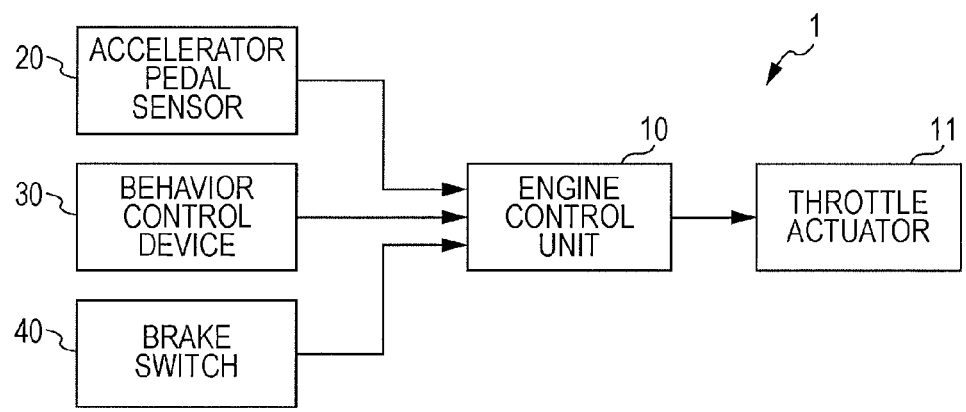
FIG. 1 is a schematic block diagram illustrating the configuration of an embodiment of an output control device for a vehicle according to the present invention.

FIG. 1 is a schematic block diagram illustrating the configuration of the output control device for a vehicle in the embodiment. An output control device 1 includes an engine control unit 10, an accelerator pedal sensor 20, a behavior control device 30, and a brake switch 40.

The engine control unit (ECU) 10 controls the engine and its auxiliary equipment (not illustrated) in an integrated manner. The engine control unit 10 includes an information processor such as a CPU, a memory unit such as a RAM or a ROM, an input/output interface, and a bus that connects these units. The engine control unit 10 is connected to a throttle actuator 11 that opens/closes a throttle valve disposed in an intake pipeline of the engine. The engine control unit 10 adjusts the output of the engine by controlling the throttle actuator 11.

The accelerator pedal sensor 20 detects an operation amount (pressing-down amount) of an accelerator pedal that a driver presses down with the driver's foot to perform a braking operation, and transmits the operation amount to the engine control unit 10. In a normal operation, the engine control unit 10 sets a target throttle opening on the basis of the pressing-down of the accelerator pedal, and controls the throttle actuator 11.

For example, when behavior such as understeering or oversteering of the vehicle occurs, the behavior control device 30 individually controls the brake fluid pressure supplied to each wheel cylinder so as to generate a braking force difference between the right and left wheels and create a yaw moment in a direction for suppressing the behavior. The behavior control device 30 is equipped with a hydraulic control unit (HCU) that is capable of individually adjusting such a brake fluid pressure of each wheel. The HCU includes a unitized pump for pressurizing the fluid, and a unitized solenoid valve for adjusting the fluid pressure of each wheel cylinder. The HCU is equipped with a fluid pressure sensor for detecting a brake fluid pressure from the booster, and a value detected by the fluid pressure sensor is transmitted to the engine control unit 10. The behavior control device 30 is connected to a speed sensor for detecting the speed of each wheel. The vehicle speed signal detected by the speed sensor is also transmitted to the engine control unit 10.

The brake switch 40 is a switch which is disposed in the brake pedal, and is configured to be turned on when the brake pedal is pressed. The output of the brake switch 40 is transmitted to the engine control unit 10.

Figure 2:
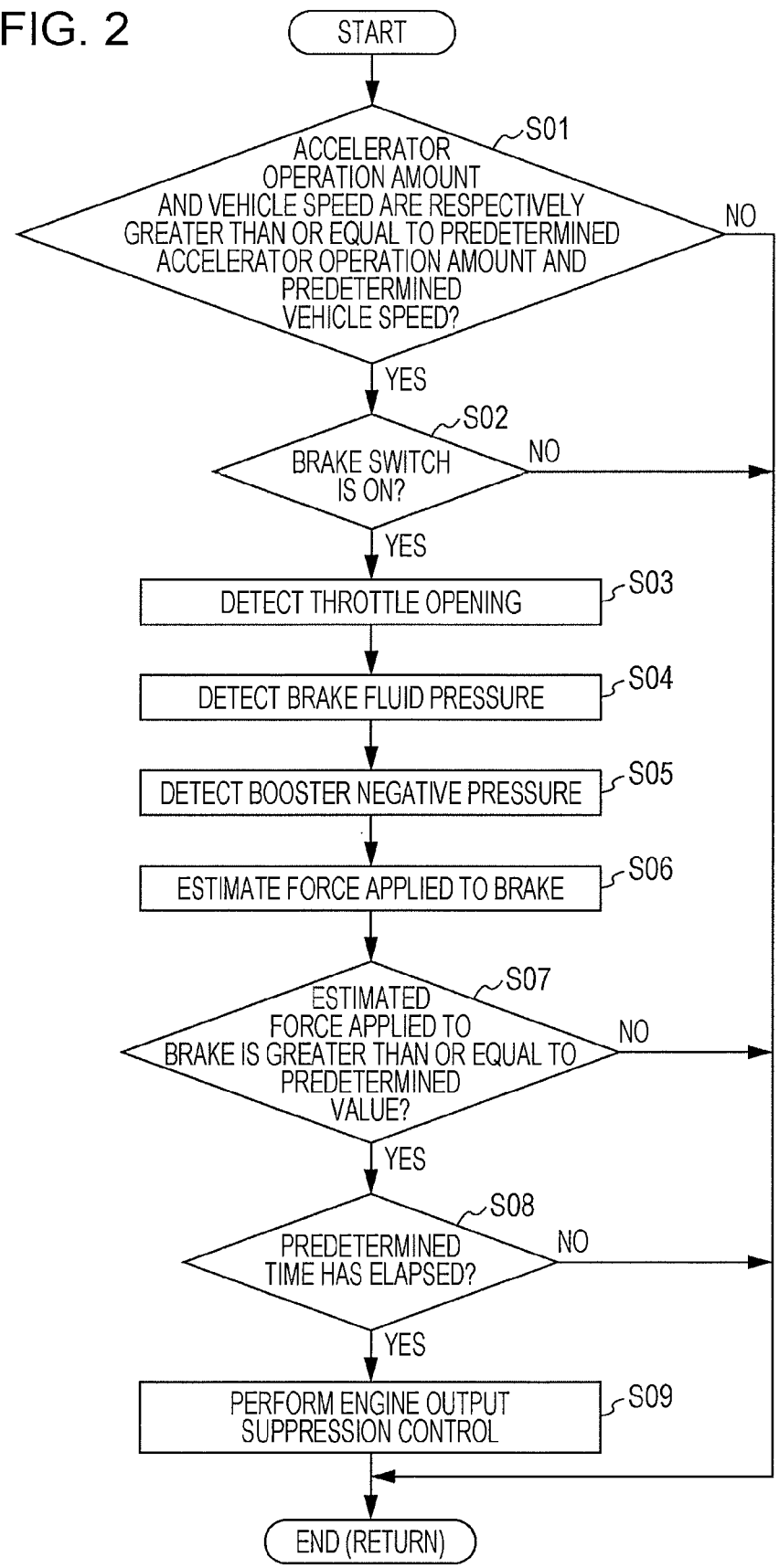
FIG. 2 is a flowchart illustrating the operation of the output control device for a vehicle of FIG. 1 when both an accelerator and a brake are applied.

The above-described output control device 1 performs the output suppression control for suppressing the output of the engine regardless of the accelerator operation in the case where an accelerator operation and a brake operation are performed at the same time and a predetermined condition is satisfied. FIG. 2 is a flowchart illustrating the operation of the output control device for a vehicle of FIG. 1 when both an accelerator and a brake are applied. Hereinafter, the operation of each step will be sequentially described.

[Step S01: Accelerator Operation Amount and Vehicle Speed Determination]

The engine control unit 10 detects a pressing-down amount (accelerator operation amount) of the accelerator pedal on the basis of the output of the accelerator pedal sensor 20, and compares the amount with a predetermined accelerator threshold value. The engine control unit 10 also compares the vehicle speed acquired by the behavior control device 30 with a predetermined vehicle speed threshold value. In the case where an accelerator operation amount is greater than or equal to the accelerator threshold value, and the vehicle speed is greater than or equal to the vehicle speed threshold value, the flow proceeds to step S02. On the other hand, in the case of otherwise, a series of processing operations are terminated (returned).

[Step S02: Brake Switch Determination]

The engine control unit 10 checks the state of the brake switch 40, and when the brake switch 40 is on, the flow proceeds to step S03. On the other hand, when the brake switch 40 is off, a series of processing operations are terminated (returned).

[Step S03: Throttle Opening Detection]

The engine control unit 10 detects the opening of the throttle valve in accordance with a control command value sent to the throttle actuator 11. Subsequently, the flow proceeds to step S04.

[Step S04: Brake Fluid Pressure Detection]

The engine control unit 10 acquires a brake fluid pressure from the behavior control device 30. Subsequently, the flow proceeds to step S05.

[Step S05: Booster Negative Pressure Estimation]

The engine control unit 10 estimates the pressure (booster negative pressure) in a negative pressure chamber of the brake booster by using the throttle opening detected in step S03, and the brake fluid pressure acquired in step S04. The estimate of the booster negative pressure is made by compensating an initial setting value using a negative pressure of the engine determined from the throttle opening, the brake fluid pressure, and the like, the initial setting value being set on the basis of the atmospheric pressure. The compensation can be made with a calculation formula in which characteristics obtained from an experiment are used.

[Step S06: Estimate of Pressing Force Applied to Brake]

Figure 3:
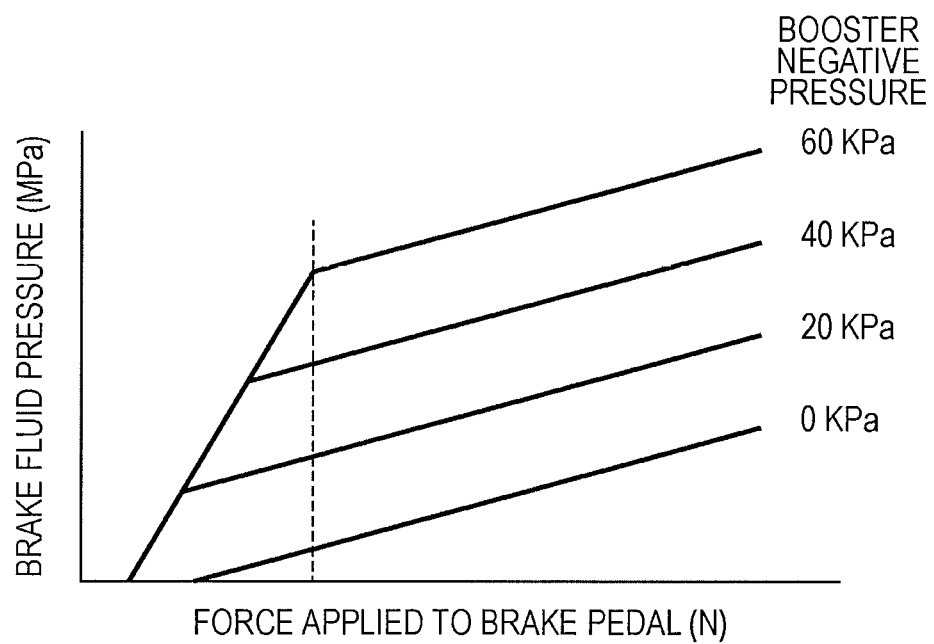
FIG. 3 is a graph illustrating an example of a correlation between a pressing force applied to the brake and a brake fluid pressure.

The engine control unit 10 estimates the pressing force applied to the brake by using the brake fluid pressure acquired in step S04, and the booster negative pressure estimated in step S05, the force being an operation force applied to the brake pedal by a driver. FIG. 3 is a graph illustrating a correlation between the pressing force applied to the brake and the brake fluid pressure. In FIG. 3, the horizontal axis indicates the brake fluid pressure and the vertical axis indicates the pressing force applied to the brake. As illustrated in FIG. 3, the correlation between the pressing force applied to the brake and the brake fluid pressure varies with the booster negative pressure, and thus it can be seen that the pressing force applied to the brake varies depending on the booster negative pressure even with the same brake fluid pressure. The engine control unit 10 stores a database of the correlations between the brake fluid pressure and the pressing force applied to the brake for different booster negative pressures, and estimates the pressing force applied to the brake by reading, from the database, the pressing force corresponding to the current brake fluid pressure and booster negative pressure. Subsequently, the flow proceeds to step S07.

[Step S07: Determination on Estimated Pressing Force Applied to Brake]

The engine control unit 10 determines whether or not the estimated pressing force applied to the brake in step S06 is greater than or equal to a predetermined brake threshold value. The brake threshold value refers to a B-A brake threshold value and an A-B brake threshold value, the B-A brake threshold value being used when a brake operation is performed first, and subsequently, an accelerator operation is performed, and the A-B brake threshold value being used when an accelerator operation is performed first, and subsequently, a brake operation is performed. The A-B brake threshold value is set to be smaller than the B-A brake threshold value. When the moving speed of a vehicle is relatively low, there are some situations (such as a restart from a temporary stop while the vehicle is running on a slope) in which the accelerator pedal and the brake pedal are presumably applied at the same time intentionally. In the present embodiment, a higher brake threshold value is set for a lower vehicle speed, and thus the output suppression control is not easily performed in a low vehicle speed range. In this manner, an unnecessary output suppression control intervention is prevented, the intention of a driver is reflected to the output suppression control, and thus the safety of the vehicle is assured. When the estimated pressing force applied to the brake is greater than or equal to the relevant brake threshold value, the flow proceeds to step S08. On the other hand, when the pressing force applied to the brake is less than the brake threshold value, a series of processing operations are terminated (returned). In the present embodiment, with the above-described configuration, control intervention can be performed with a substantially constant pressing force applied to the brake (pedal operation force) even when the booster negative pressure varies. Here, Table 1 shows the brake fluid pressure corresponding to a constant brake threshold value, for each booster negative pressure.

TABLE 1

| | | BRAKE FLUID PRESSURE (MPa) |
|---|---|---|
| BOOSTER NEGATIVE PRESSURE (KPa) | 0 | 0.5 |
| | 5 | 1.2 |
| | 10 | 2 |
| | 20 | 3.2 |
| | 30 | 4.5 |

As indicated in Table 1, the brake fluid pressure corresponding to the brake threshold value increases as the booster negative pressure increases.

[Step 08: Determination of Predetermined Time Elapse]

When for a predetermined delay time (for example, approximately two seconds) or longer, a state continues in which an accelerator operation amount is greater than or equal to the accelerator threshold value, and the estimated pressing force applied to the brake is greater than or equal to the brake threshold value, the flow proceeds to step S09. When the state continues for less than a predetermined time, a series of processing operations are terminated (returned). The delay time is reduced when an accelerator operation amount is large, and there is no sufficient booster negative pressure, and the delay time is extended when an accelerator operation amount is small, and there is a sufficient booster negative pressure. When the estimated pressing force applied to the brake is large, it is assumed that it is probable that the driver intends to stop the vehicle, and thus the delay time is reduced in relation to an increase in the estimated pressing force applied to the brake.

[Step S09: Engine Output Suppression Control Performance]

Figure 4A:
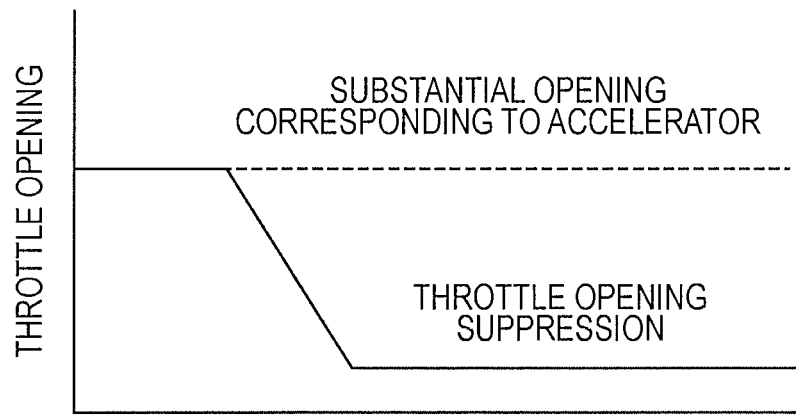
FIGS. 4A and 4B are diagrams schematically illustrating a change in a throttle opening when output suppression control is started and terminated, respectively, in the output control device for a vehicle of FIG. 1.
Figure 4B:
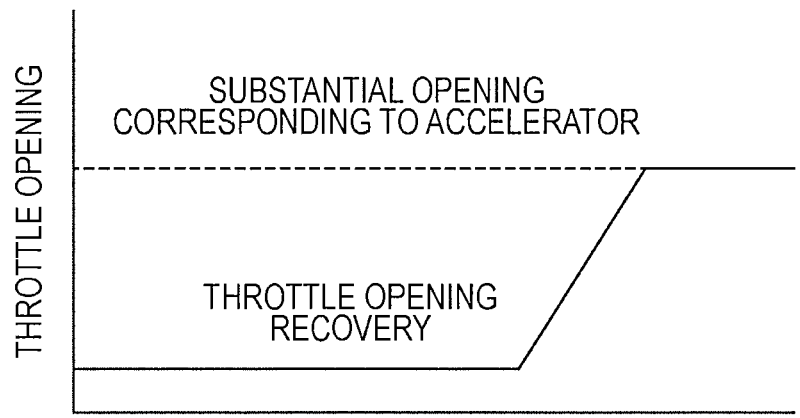

The engine control unit 10 performs engine output suppression control for controlling the output of the engine for a predetermined continuous control time in order to give a higher priority to deceleration of the brake. Suppression of the engine output is performed by reducing the opening of the throttle valve down to a predetermined opening (for example, the opening at the time of idling) regardless of the accelerator operation amount. FIG. 4 are diagrams schematically illustrating a change in a throttle opening when output suppression control is started and terminated, respectively, in the output control device for a vehicle of FIG. 1. As illustrated in FIG. 4A, when the output suppression control is started, the throttle opening is gradually changed from the substantial opening for the accelerator (the throttle opening in a normal operation, which is set on the basis of the accelerator operation amount) to the throttle opening at the time of idling over a predetermined time. As illustrated in FIG. 4B, when the throttle opening is recovered from that in the output suppression control, the throttle opening is gradually changed from the throttle opening at the time of idling to the substantial opening for the accelerator over a predetermined time. When a brake operation is terminated (the brake switch 40 is turned off) during the output suppression control, the control is also terminated. In addition, when an accelerator operation (movement of the accelerator pedal) greater than or equal to a predetermined value is detected, the control is terminated under the assumption that the driver applies the accelerator and the brake intentionally (positively) at the same time. Subsequently, a series of processing operations are terminated (returned).

In the present embodiment, in order to enable the vehicle to be stopped safely by performing the output suppression control even when the pressing force applied to the brake by the driver is weak, or a defect occurs in the booster negative pressure, backup control is provided which counts continuous operating time of the brake switch 40, and performs the engine output suppression control intervention for a certain counted operating time or longer even when a brake operation force is less than the brake threshold value.

As described above, according to the present embodiment, the following effects can be obtained.

(1) The output suppression control is performed when for a predetermined delay time or longer, a state continues in which both an accelerator operation amount and a brake operation force are greater than or equal to the respective predetermined threshold values, and the estimated pressing force applied to the brake is greater than or equal to the brake threshold value, thereby making it possible to prevent the output suppression control from being performed against the intention of a driver when an accelerator operation and a brake operation are temporarily performed at the same time, for example, at the time of a heel-and-toe operation, or a temporary stop on a slope.

(2) When a brake operation followed by an accelerator operation is performed, both operations are probably performed intentionally by a driver, and thus control intervention against the intention of a driver can be prevented by setting a high B-A brake threshold value. On the other hand, when an accelerator operator followed by a brake operation is performed, the operating accelerator may have a problem such as a fixed accelerator problem, and thus the output suppression control intervention can be easily achieved by setting the A-B brake threshold value lower than the B-A brake threshold value, thereby assuring the safety of the vehicle.

(3) When the output suppression control is determined to be performed, and the estimated pressing force applied to the brake is strong, the intention of the driver to stop the vehicle is assumed to be probable, and thus the safety of the vehicle reflecting the intention of the driver is assured by advancing the timing of intervention of the output suppression control. When the accelerator operation amount is large, there is assumed to be no sufficient booster negative pressure, and thus the safety of the vehicle is assured by advancing the timing of intervention of the output suppression control.

(4) The brake operation force can be estimated by using a fluid pressure sensor which is typically disposed in the behavior control device 30, and thus a new sensor does not need to be installed in the vehicle, thereby enabling the configuration of the device to be simplified.

(5) By compensating the brake operation force estimated on the basis of the brake fluid pressure, by using the booster negative pressure, the accuracy in estimating the brake operation force can be improved and more appropriate control can be performed.

[Modification]

The present invention is not limited to the above-described embodiment, and various modifications and changes can be made. Modified or changed embodiments are also within the technical scope of the present invention.

(1) In the embodiment, the drive power source of the vehicle is, for example, a gasoline engine, but may be a diesel engine. In this case, the output can be suppressed by reducing the fuel injection quantity. The drive power source may be an internal combustion engine of another type. In addition, the drive power source may be, for example, an electric motor, or a hybrid system including an engine and an electric motor.

(2) In the embodiment, the negative pressure of the brake booster is determined by an estimation, however, a negative pressure sensor may be provided to directly detect the negative pressure.

(3) The estimate of the brake operation force is not limited to an estimating technique in which the brake fluid pressure and the booster negative pressure are used, and other techniques may be used. For example, the brake operation force may be estimated from reduced vehicle speed or the like. The brake operator may be equipped with a sensor for detecting an operation force.

What is claimed is:

1. An output control device for a vehicle, comprising:
    an accelerator operator to receive an output adjustment operation of a drive power of a vehicle;
    a brake operator to receive a braking operation of a braking device;
    an accelerator operation amount detection unit for detecting an operation amount of the accelerator operator;
    a brake operation force estimation unit for estimating an operation force of the brake operator; and
    an output suppression control unit for suppressing an output of the drive power regardless of a state of the accelerator operator, in the case where a state in which the operation amount of the accelerator operator is greater than or equal to a predetermined accelerator threshold value continues for a predetermined time or longer, and the operation force estimated by the brake operation force estimation unit is greater than or equal to a predetermined brake threshold value,
    wherein the brake threshold value in the case where the brake operator is operated before the accelerator operator is operated is set to be greater than the brake threshold value in the case where the accelerator operator is operated before the brake operator is operated.

2. The output control device for a vehicle according to claim 1,
    wherein the brake operation force estimation unit estimates the brake operation force on the basis of a brake fluid pressure.

3. The output control device for a vehicle according to claim 2,
    wherein the brake operation force estimation unit estimates the brake operation force on the basis of a brake fluid pressure, and compensates a value of the estimated brake operation force by using a negative pressure of a negative pressure brake booster.

4. The output control device for a vehicle according to claim 1,
    wherein a time until a start of output suppression performed by the output suppression control unit is changed in accordance with at least one of the operation force estimated by the brake operation force estimation unit and the operation amount of the accelerator operator.

5. The output control device for a vehicle according to claim 4,
    wherein the brake operation force estimation unit estimates the brake operation force on the basis of a brake fluid pressure.

6. The output control device for a vehicle according to claim 5,
    wherein the brake operation force estimation unit estimates the brake operation force on the basis of a brake fluid pressure, and compensates a value of the estimated brake operation force by using a negative pressure of a negative pressure brake booster.

7. An output control device for a vehicle, comprising:
an accelerator operator to receive an output adjustment operation of a drive power of a vehicle;
a brake operator to receive a braking operation of a braking device;
an accelerator operation amount detection unit for detecting an operation amount of the accelerator operator;
a brake operation force estimation unit for estimating an operation force of the brake operator; and
an output suppression control unit for suppressing an output of the drive power regardless of a state of the accelerator operator, in the case where a state in which the operation amount of the accelerator operator is greater than or equal to a predetermined accelerator threshold value continues for a predetermined time or longer, and the operation force estimated by the brake operation force estimation unit is greater than or equal to a predetermined brake threshold value,
wherein a time until a start of output suppression performed by the output suppression control unit is changed in accordance with at least one of the operation force estimated by the brake operation force estimation unit and the operation amount of the accelerator operator.

8. The output control device for a vehicle according to claim 7,
wherein the brake operation force estimation unit estimates the brake operation force on the basis of a brake fluid pressure.

9. The output control device for a vehicle according to claim 8,
wherein the brake operation force estimation unit estimates the brake operation force on the basis of a brake fluid pressure, and compensates a value of the estimated brake operation force by using a negative pressure of a negative pressure brake booster.

10. An output control device for a vehicle, comprising:
an accelerator operator to receive an output adjustment operation of a drive power of a vehicle;
a brake operator to receive a braking operation of a braking device;
an accelerator operation amount detection unit for detecting an operation amount of the accelerator operator;
a brake operation force estimation unit for estimating an operation force of the brake operator on the basis of a brake fluid pressure, and compensating a value of the estimated brake operation force by using a negative pressure of a negative pressure brake booster; and
an output suppression control unit for suppressing an output of the drive power regardless of a state of the accelerator operator, in the case where a state in which the operation amount of the accelerator operator is greater than or equal to a predetermined accelerator threshold value continues for a predetermined time or longer, and the operation force estimated by the brake operation force estimation unit is greater than or equal to a predetermined brake threshold value.

11. The output control device for a vehicle according to claim 10,
wherein the brake threshold value in the case where the brake operator is operated before the accelerator operator is operated is set to be greater than the brake threshold value in the case where the accelerator operator is operated before the brake operator is operated.

12. The output control device for a vehicle according to claim 10,
wherein a time until a start of output suppression performed by the output suppression control unit is changed in accordance with at least one of the operation force estimated by the brake operation force estimation unit and the operation amount of the accelerator operator.

* * * * *